United States Patent
An et al.

(10) Patent No.: US 11,230,213 B2
(45) Date of Patent: Jan. 25, 2022

(54) HEIGHT-ADJUSTABLE CUP HOLDER

(71) Applicants: HYUNDAI MOTOR COMPANY, Seoul (KR); KIA MOTORS CORPORATION, Seoul (KR); NIFCO KOREA INC., Asan-si (KR)

(72) Inventors: Jae Hyun An, Seosan-si (KR); Kyu Rok Kim, Hwaseong-si (KR); Ik Jin Jung, Ansan-si (KR); Won Sang Cho, Asan-si (KR)

(73) Assignees: HYUNDAI MOTOR COMPANY, Seoul (KR); KIA MOTORS CORPORATION, Seoul (KR); NIFCO KOREA INC., Asan-si (KR)

( * ) Notice: Subject to any disclaimer, the term of this patent is extended or adjusted under 35 U.S.C. 154(b) by 0 days.

(21) Appl. No.: 17/036,812

(22) Filed: Sep. 29, 2020

(65) Prior Publication Data
US 2021/0309139 A1    Oct. 7, 2021

(30) Foreign Application Priority Data
Apr. 6, 2020  (KR) .................. 10-2020-0041492

(51) Int. Cl.
| | |
|---|---|
| *B60N 3/00* | (2006.01) |
| *B60N 3/10* | (2006.01) |
| *A47G 23/02* | (2006.01) |

(52) U.S. Cl.
CPC ......... *B60N 3/108* (2013.01); *A47G 23/0208* (2013.01)

(58) Field of Classification Search
None
See application file for complete search history.

(56) References Cited

U.S. PATENT DOCUMENTS

| | | | | |
|---|---|---|---|---|
| 5,285,953 | A | * | 2/1994 | Smith .................... B60N 3/103 220/737 |
| 8,439,438 | B2 | | 5/2013 | Oldani et al. |
| 9,221,581 | B2 | | 12/2015 | Yokota et al. |
| 10,279,721 | B1 | * | 5/2019 | Nelson ............... B65D 81/3881 |
| 10,308,155 | B1 | * | 6/2019 | Cline .................... B60N 3/102 |

(Continued)

FOREIGN PATENT DOCUMENTS

| | | |
|---|---|---|
| CN | 102951058 B | 4/2015 |
| CN | 104786897 A | 7/2015 |
| DE | 102010055591 A1 | 6/2012 |

(Continued)

*Primary Examiner* — Steven M Marsh
(74) *Attorney, Agent, or Firm* — McDonnell Boehnen Hulbert & Berghoff LLP

(57) ABSTRACT

The present disclosure provides a height-adjustable cup holder. The cup holder includes a cup holder housing including a first stand and a second stand, which are positioned adjacent to each other, a guide member positioned on a bottom surface of the cup holder housing between the first stand and the second stand, a cup holder unit, which includes a first cup holder plate, a second cup holder plate, and a central member, which is positioned between the first cup holder plate and the second cup holder plate and is fitted onto the guide member, the cup holder unit being releasably coupled to the cup holder housing, and first and second support plates, which are moved along the respective cup holder plates so as to hold the cup holder unit on an inner side surface of the cup holder housing.

16 Claims, 15 Drawing Sheets

(56) References Cited

U.S. PATENT DOCUMENTS 10,506,890 B2 * 12/2019 Sawada .............. A47G 23/0216
11,001,184 B2 *  5/2021 Kotsuji ................. B60N 3/105

FOREIGN PATENT DOCUMENTS

| DE | 102014214278 A1 | 1/2016 |
|----|----|----|
| JP | 2005-324594 A | 11/2005 |
| JP | 2006-044516 A | 2/2006 |
| JP | 2008-221993 A | 9/2008 |
| JP | 2010-215073 A | 9/2010 |
| JP | 2012-046090 A | 3/2012 |
| JP | 2012-201257 A | 10/2012 |
| JP | 2015-136976 A | 7/2015 |
| JP | 2015-223979 A | 12/2015 |
| JP | 2016-159659 A | 9/2016 |
| JP | 2016-159663 A | 9/2016 |
| KR | 2008-0102801 A | 11/2008 |
| KR | 10-1574440 B1 | 12/2015 |
| WO | 2016/012200 A1 | 1/2016 |

* cited by examiner

WHEN PUSHED

HEIGHT-ADJUSTABLE CUP HOLDER

CROSS REFERENCE TO RELATED APPLICATIONS

This application claims under 35 U.S.C. § 119(a) the benefit of priority to Korean Patent Application No. 10-2020-0041492 filed on Apr. 6, 2020, the entire contents of which are incorporated herein by reference.

BACKGROUND

(a) Technical Field

The present disclosure relates to a height-adjustable cup holder. More particularly, a height-adjustable cup holder which includes a removable cup holder housing, and a cup holder plate, and which is capable of being held at different heights through simple manipulation, depending on the orientation in which the cup holder unit is received in the cup holder housing.

(b) Background Art

Generally, a vehicle is provided with cup holder assembly systems at various front and rear locations in the interior thereof so as to allow a driver or a passenger, after drinking a beverage contained in a drinking cup, can, or bottle, to put the container into one of the cup holder assembly systems in order to safely store the beverage in the container.

A conventional cup holder assembly system is constructed such that a cup holder housing, which defines a cup-receiving space therein, is not provided with an additional support. Hence, when a beverage can, cup, or bottle is received in the cup holder housing, the beverage can, cup or bottle can be shaken in all directions due to vibrations generated during traveling of the vehicle in the case in which the diameter of the cup holder housing is larger than the diameter of the beverage can, cup, or bottle, and thus there is a large space between the beverage can, cup, or bottle and the cup holder housing.

On the other hand, when there is little space between the beverage can, cup, or bottle and the cup holder housing, it is difficult for a driver or a passenger to take the can, cup, or bottle out of the cup holder housing because the can, cup, or bottle is tightly fitted in the cup holder housing.

Furthermore, because the height at which a cup is held is fixed depending on the shape of the cup holder housing, there is a need for a cup holder capable of being adjusted in height according to the length or size of a cup.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art. It is an object of the present disclosure to provide a height-adjustable cup holder, which is provided with a cup holder unit capable of being selectively held so as to adjust a height of a cup holder plate according to the height of a cup.

Another object of the present disclosure is to provide a height-adjustable cup holder, which is provided with an upper plate capable of being selectively held at a predetermined height in one of two stands, which are positioned adjacent to each other, thereby making it possible to adjust a cup holder plate.

A further object of the present disclosure is to provide a height-adjustable cup holder, which is provided with a removable cup holder unit so as to improve convenience in use.

The objects of the present disclosure are not limited to the above-mentioned objects, and other objects of the present disclosure, which are not mentioned above, will be clearly understood from the following descriptions of preferred embodiments and will be apparent from the preferred embodiments of the present disclosure. The above objects and other objects of the present disclosure are achieved by the means and combinations thereof disclosed in the claims.

In one aspect, the present disclosure provides a height-adjustable cup holder including a cup holder housing including a first stand and a second stand, which are positioned adjacent to each other, a guide member positioned on a bottom surface of the cup holder housing between the first stand and the second stand, a cup holder unit, which includes a first cup holder plate, a second cup holder plate, and a central member, which is positioned between the first cup holder plate and the second cup holder plate and is fitted onto the guide member, the cup holder unit being releasably coupled to the cup holder housing, and first and second support plates, which are moved along the respective cup holder plates so as to hold the cup holder unit on an inner side surface of the cup holder housing, wherein the support plates are selectively fitted into at least two support grooves formed in the inner side surface of the cup holder housing.

In an embodiment, the guide member may include an outer stopper, positioned adjacent to the second stand between the first stand and the second stand, and an inner stopper, positioned adjacent to the first stand and spaced apart from the outer stopper.

In another embodiment, each of the outer and inner stoppers may include a protrusion formed at a first end thereof, which is positioned at a height corresponding to the support grooves.

In still another embodiment, when the first cup holder plate is received in the first stand, the first support plate, which is provided at the first cup holder plate, may be brought into contact at a first end thereof with the protrusion of the inner stopper and may be inserted at a second end thereof into one of the support grooves.

In yet another embodiment, when the second cup holder plate is received in the second stand, the second support plate, which is provided at the second cup holder plate, may be brought into contact at a first end thereof with the protrusion of the outer stopper and may be inserted at a second end thereof into a remaining one of the support grooves.

In still yet another embodiment, when the second cup holder plate is received in the first stand, the second cup holder plate may be positioned so as to be in contact with a bottom surface of the cup holder housing.

In a further embodiment, when the second cup holder plate is received in the first stand, the first cup holder plate may be received in the second stand.

In another further embodiment, each of the first and second cup holder plates may include an elastic element for applying elastic force to restore a corresponding one of the first and second support plates to an initial position.

In still another further embodiment, the height-adjustable cup holder may further include at least one frictional member, which is provided at the cup holder housing so as to face the central member.

In yet another further embodiment, the height-adjustable cup holder may further include a groove formed in the central member in a height direction, a lever movable along the groove, and an upper plate coupled to the lever and disposed on an upper surface of one of the first and second cup holder plates.

In still yet another further embodiment, the height-adjustable cup holder may further include an upper support plate, which is provided on a lower surface of the upper plate and is fitted into a corresponding one of the support grooves.

In still yet another further embodiment, the upper support plate may be moved toward the guide member by force applied to the lever in a height direction.

In a still further embodiment, the lever may include a first oblique portion and a second oblique portion, the first oblique portion being configured so as to move the upper support plate toward the central member when the lever is moved upwards in a height direction.

In a yet still further embodiment, the second oblique portion may be configured so as to move the upper support plate toward the central member when the lever is moved downwards in a height direction.

In a still yet further embodiment, the height-adjustable cup holder may further include a protective member, which is provided at an inner surface of the central member facing the guide member.

Other aspects and embodiments of the disclosure are discussed infra.

It is understood that the term "vehicle" or "vehicular" or other similar term as used herein is inclusive of motor vehicles in general, such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example vehicles powered by both gasoline and electricity.

BRIEF DESCRIPTION OF THE FIGURES

The above and other features of the present disclosure will now be described in detail with reference to certain exemplary embodiments thereof, illustrated in the accompanying drawings which are given hereinbelow by way of illustration only, and thus are not limitative of the present disclosure, and wherein.

Figure 1:
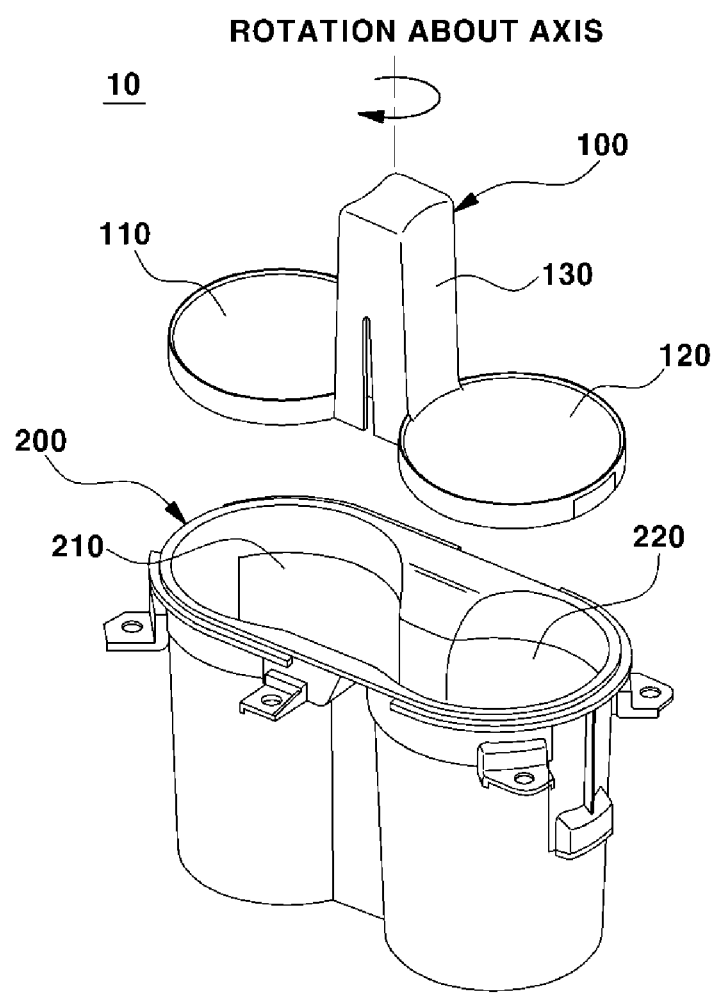
FIG. 1 is a perspective view illustrating a height-adjustable cup holder according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, the reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments that may be included within the spirit and scope of the disclosure as defined by the appended claims.

Hereinafter, embodiments of the present disclosure will be described in detail with reference to the accompanying drawings. The embodiments of the present disclosure may be modified into various forms, and the scope of the present disclosure should not be construed as being limited to the following embodiments. These embodiments are provided so that this disclosure will be thorough and complete, and will fully convey the scope of the disclosure to those skilled in the art.

The term "part", "unit" or "module" means a unit for performing at least one function or action, and may be realized by hardware or a combination of hardware.

It will be understood that, although the terms "first", "second", etc. may be used herein to describe various similar elements, these elements should not be construed to be limited by these terms. These terms are only used to distinguish one element from another.

FIG. 1 illustrates a height-adjustable cup holder 10 according to an embodiment of the present disclosure, which is positioned inside a vehicle.

The present disclosure is directed to a height-adjustable cup holder 10. The height-adjustable cup holder 10 includes a cup holder housing 200 composed of first and second cup stands 210 and 220, which are positioned adjacent to each other, and a cup holder unit 100 coupled to the cup holder housing 200. The cup holder unit 100 may be integrally coupled to the cup holder housing 200 so as to be capable of being positioned at different heights. Furthermore, first and second cup holder plates 110 and 120 of the cup holder 100 are capable of being positioned at different heights.

The cup holder housing 200 includes the first stand 210, the second stand 220, and a guide member 230 positioned between the first stand 210 and the second stand 220. The guide member 230 projects in a height direction of the cup holder housing 200, and includes an inner protrusion 233 and an outer protrusion 235, which are positioned at the upper end of the guide member 230.

Each of the first and second stands 210 and 220 is configured to have a cylindrical space so as to receive a cup therein. According to an embodiment of the present disclosure, the first stand 210 and the second stand 220 are configured to have the same shape.

The cup holder 10 includes the cup holder unit 100, which is configured to correspond to the cup holder housing 200 and is fitted onto the guide member 230. The cup holder unit 100 includes a central member 130, which is fitted onto the guide member 230 and includes the first cup holder plate 110 and the second cup holder plate 120.

The first cup holder plate 110 may be received in one of the first stand 210 and the second stand 220, and the second cup holder plate 120 may be received in the stand other than the stand in which the first cup holder plate 110 is received.

The cup holder plate 110 includes a first guide plate 115, which is open at the upper face thereof, and includes a slot 116 formed in the outermost side surface of the first guide plate 115. A first support plate 111 may project a width direction of the first cup holder plate 110 through the slot 116. Similarly, the second cup holder plate 120 includes a second guide plate 125 having a slot 126 formed in the outermost side surface of the second guide plate 125 such that a second support plate 121 project in a width direction of the second cup holder plate 120 through the slot 126.

According to an embodiment, when the first cup holder plate 110 is received in the first stand 210, the second cup holder plate 120 is received in the second stand 220. When the first cup holder plate 110 is received in the first stand 210, the first support plate 111, which is positioned at the first cup holder plate 110, is pushed along the flat surface of the first cup holder plate 110 and then enters a support groove 240 formed in the inner surface of the cup holder housing 200.

Meanwhile, when the first cup holder plate 110 is received in the second stand 220, the second cup holder plate 120 is received in the first stand 210. When the first cup holder plate 110 is received in the second stand 220, the lower surfaces of the first and second cup holder plates 110 and 120 come into contact with the bottom surface of the cup holder housing 200 without any interference between the guide member 230 and the first and second support plates 111 and 121.

In this way, the cup holder unit 100 is removably coupled to the cup holder housing 200 so as to enable the first cup holder plate 110 and the second cup holder plate 120 to selectively be received in desired stands according to the user's intention. Consequently, since the first and second cup holder plates 110 and 120 are supported by one or more support grooves 240 positioned at a determined height or are brought into contact with the bottom surface of the cup holder housing 200, it is possible to select the height of the first cup holder plate 110 and the second cup holder plate 120.

Figure 2A:
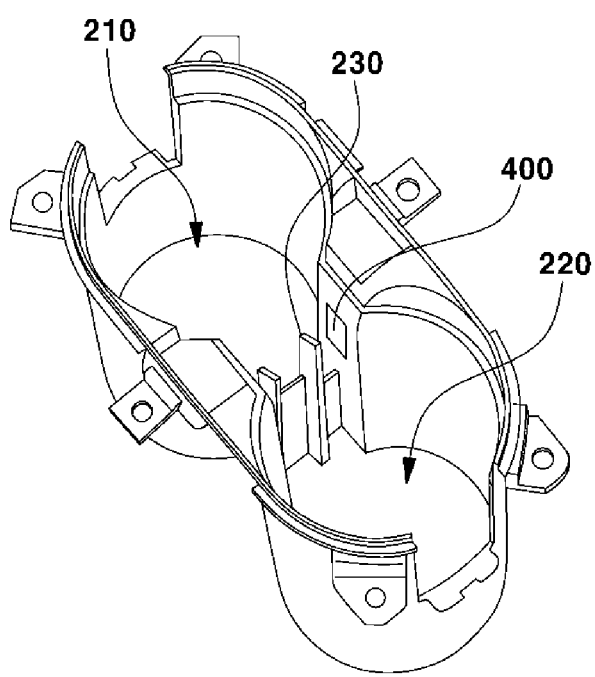
FIG. 2A is a perspective view illustrating a cup holder housing according to an embodiment of the present disclosure.
Figure 2B:
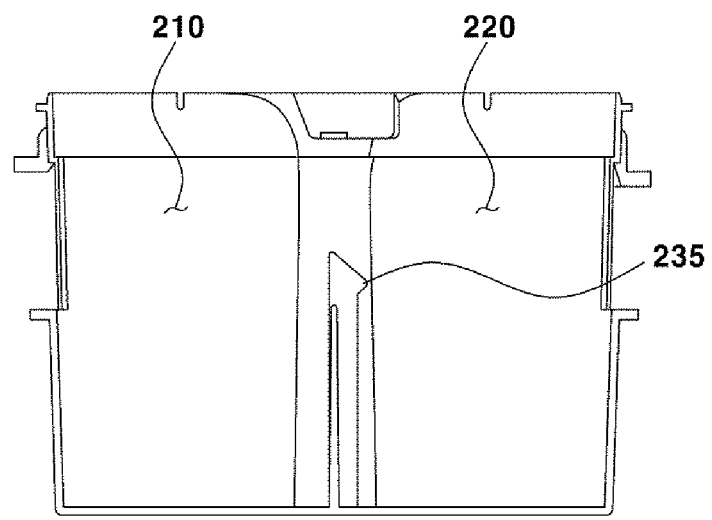
FIG. 2B is a side cross-sectional view illustrating the cup holder housing according to the embodiment of the present disclosure.
Figure 2C:
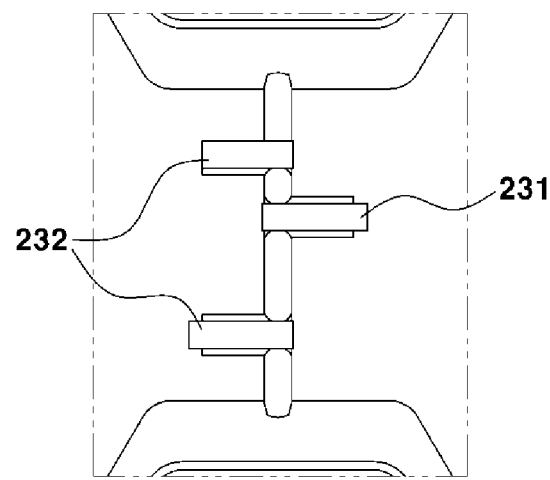
FIG. 2C is a plan view illustrating a guide member according to an embodiment of the present disclosure, which is positioned inside the cup holder housing.

FIGS. 2A and 2B illustrate the guide member 230 according to an embodiment of the present disclosure, which is positioned inside the cup holder housing 200.

As illustrated in the drawings, the guide member 230 is positioned between the first stand 210 and the second stand 220, and includes an inner stopper 231, which is positioned adjacent to the first stand 210, and an outer stopper 232, which is spaced apart from the inner stopper 231 and is positioned adjacent to the second stand 220.

The cup holder housing 200, in which the cup holder unit 100 is received, is provided on the inner surface thereof with one or more frictional members 400 such that the central member 130 is held in place by means of the frictional members 400 when the central member 130 is received in the cup holder housing 200. Specifically, the one or more frictional members 400 may be provided at positions that face the central member 130, and may be fitted into holes formed through the cup holder housing 200.

The interior of the central member 130 of the cup holder unit 100 is configured to have a shape corresponding to the shape of the guide member 230, which is composed of the inner stopper 231 and the outer stopper 232. Specifically, the interior of the central member 130 is configured to have a shape corresponding to the inner stopper 231 and the outer stopper 232 when the first cup holder plate 110 is received in the second stand 220.

According to an embodiment of the present disclosure, the outer stopper 232 may be composed of two outer stoppers 232, and the inner stopper 231 may be positioned between the two outer stoppers 232. The upper surfaces of the inner stopper 231 and the outer stopper 232, which face the central member 130, may be inclined.

According to an embodiment of the present disclosure, the upper ends of the inner stopper 231 and the outer stopper 232, which face the inside of the central member 130, include respective protrusions 233, 235. When the first cup holder plate 110 is received in the first stand 210, the protrusion 233 of the inner stopper 231 is brought into contact with first end of the first support plate 111, whereby the second end of the first support plate 111 project and is thus inserted into the support groove 240 while the first support plate 111 interferes with the first cup holder plate 110.

Meanwhile, when the second cup holder plate 120 is received in the second stand 220, the protrusion 235 of the outer stopper 232 is brought into contact with first end of the second support plate 121, whereby the second end of the second support plate 121 is projected and is thus inserted into the support groove 240 while the second support plate 121 interferes with the second cup holder plate 120.

The protrusions 233, 235 are provided at positions corresponding to the support grooves 240 formed in the inner surface of the cup holder housing 200. When the cup holder unit 100 is fitted onto the guide member 230, the protrusions 233, 235 are brought into contact with the first ends of the first and second support plates 111 and 121, and thus the first and second support plates 111 and 121 are inserted into the support grooves 240 and are engaged therewith.

Figure 2D:
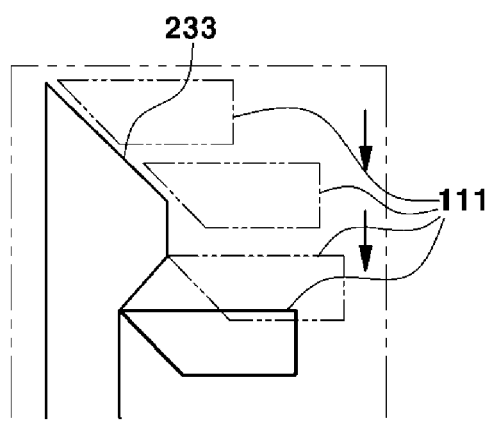
FIG. 2D is a view illustrating an operational relationship between the guide member and a support plate according to an embodiment of the present disclosure.

FIG. 2D illustrates the protrusion 233, which is positioned at the inner stopper 231, and support plate 111, which is in contact with the protrusion 233.

The protrusions 233, 235 are positioned at the upper end of each of the inner stopper 231 and the outer stopper 232, and an inclined surface is provided at the upper surface of each of the inner stopper 231 and the outer stopper 232 so as to be connected to at least a portion of the protrusions 233, 235.

When the first cup holder plate 110 is received in the first stand 210, the first support plate 111, which is provided at the lower surface of the first cup holder plate 110, is brought into contact at the first end thereof with the protrusions 233, 235, and thus the second end of the first support plate 111 is projected outwards from the first cup holder plate 110. Consequently, the second end of the first support plate 111 is inserted into the support groove 240 formed in the inner surface of the cup holder housing 200, thereby holding the cup holder unit 100.

Meanwhile, when the first cup holder plate 110 is received in the second stand 220 while the second cup holder plate 120 is received in the first stand 210, the lower surfaces of the first and second cup holder plates 110 and 120 come into contact with the bottom surface of the cup holder housing 200 because the protrusions 233, 235 do not interfere with the first and second support plates 111 and 121.

Figure 3A:
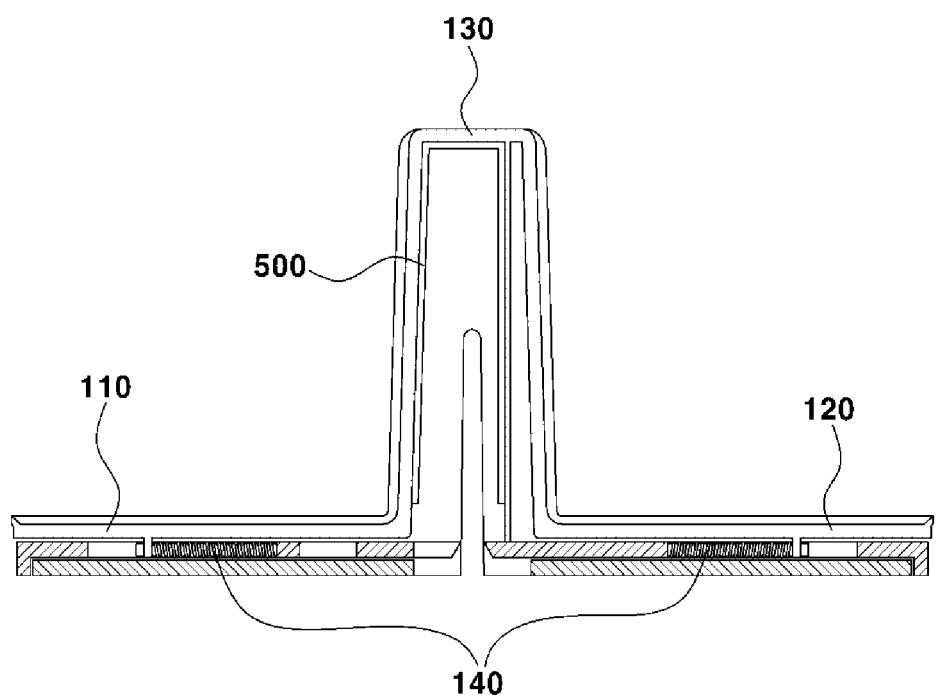
FIG. 3A is a plan view illustrating a cup holder unit according to an embodiment of the present disclosure.
Figure 3B:
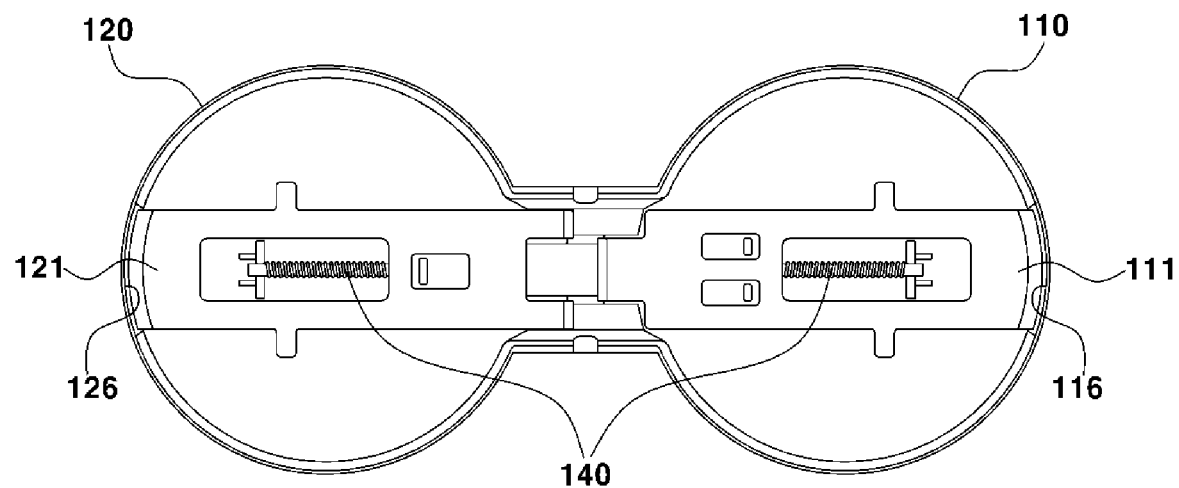
FIG. 3B is a bottom view illustrating the cup holder unit according to the embodiment of the present disclosure.

FIGS. 3A and 3B are a front cross-section view and a bottom view of the cup holder unit 100, which is removably coupled to the cup holder housing 200.

The cup holder unit 100 includes the first cup holder plate 110 and the second cup holder plate 120, which are received in the first and second stands 210 and 220, and the central member 130, which is positioned between the first cup holder plate 110 and the second cup holder plate 120 and is fitted onto the guide member 230 provided at the cup holder housing 200.

The central member 130 may include a protective member 500 having a predetermined elastic force in a region thereof that faces the guide member 230. Consequently, it is possible to prevent breakage or damage to the central member 130, which faces the guide member 230, by virtue of the protective member.

According to an embodiment of the present disclosure, the first cup holder plate 110 and the second cup holder plate 120 are configured to be symmetrical with each other with respect to the central member 130 and to have the same shape. Accordingly, each of the first cup holder plate 110 and the second cup holder plate 120 may be selectively received in any of the first stand 210 and the second stand 220.

The first cup holder plate 110 and the second cup holder plate 120 are respectively provided with the first support plate 111 and the second support plate 121, which are projected outwards along the respective flat surfaces of the first and second cup holder plates 110 and 120 and are selectively inserted into the support grooves 240 formed in the cup holder housing 200.

Specifically, when the first cup holder plate 110 is received in the first stand 210 while the second cup holder plate 120 is received in the second stand 220, the first ends of the first and second support plates 111 and 121 are brought into contact with the protrusions 233, 235, and the second ends of the first support plates 111 and 121 are thus projected outwards from the first and second cup holder plates 110 and 120.

The first and second support plates 111 and 121 are positioned at the lower surfaces of the first and second cup holder plates 110 and 120, and are moved longitudinally along recesses formed in the first and second cup holder plates 110 and 120. The first and second support plates 111 and 121, which are positioned adjacent to the central member 130, are configured to have shapes corresponding to the inner protrusion 233 and the outer protrusion 235.

When the first and second support plates 111 and 121 are received in the cup holder housing 200 and thus interfere with the inner protrusion 233 and the outer protrusion 235, the first and second plates 111 and 121 are pushed outwards. In order to restore the pushed first and second support plates 111 and 121 to the initial positions thereof, elastic elements 140 are respectively provided between the first and second support plates 111 and 121 and the first and second cup holder plates 110 and 120.

Specifically, each of the elastic elements 140 is positioned at the inner side of a corresponding one of the first and second support plates 111 and 121, and is secured at a first end thereof to a corresponding one of the first and second guide plates 115 and 125 so as to apply the elastic force in a direction opposite the projecting direction of the corresponding one of the first and second support plates 111 and 121.

Accordingly, when the first and second support plates 111 and 121 are pushed due to contact with the protrusions 233, 235 and are moved away from the protrusions, the first and second support plates 111 and 121 are subjected to elastic force for restoring the first and second support plates 111 and 121 to the initial inner side positions thereof.

Figure 4A:
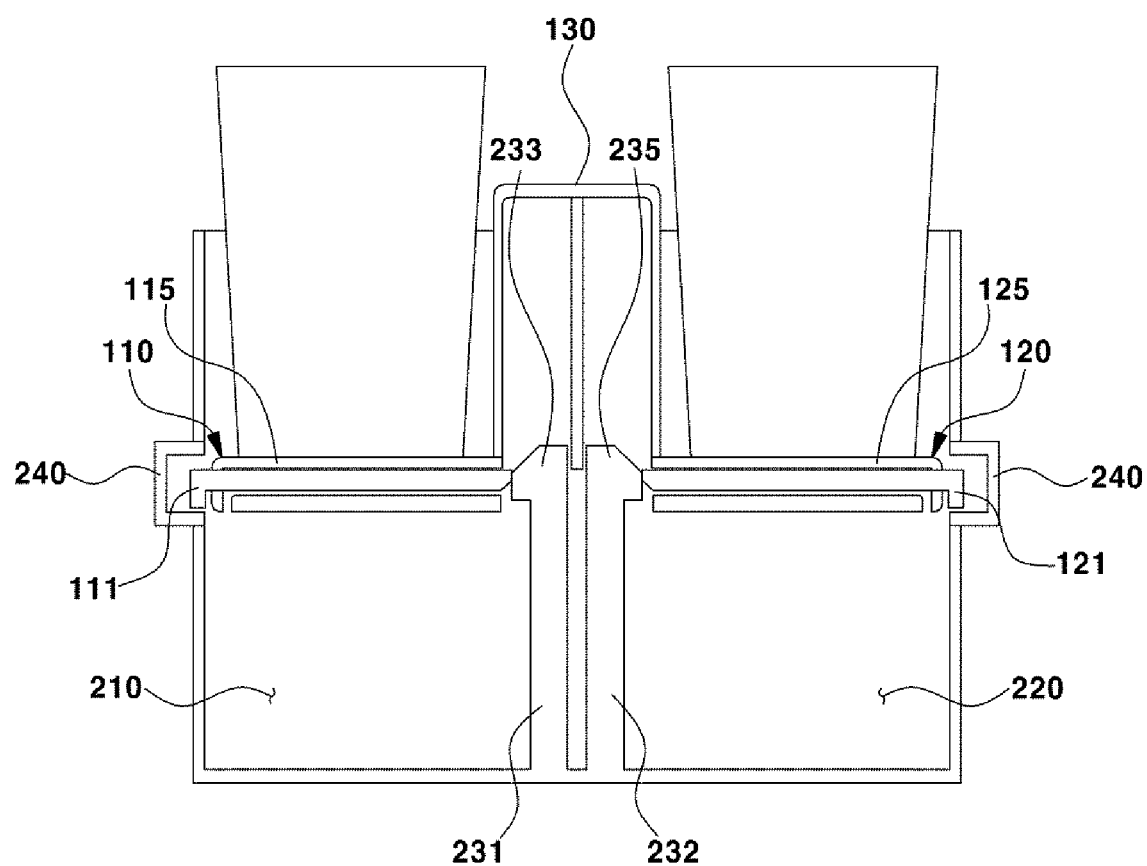
FIG. 4A is a side cross-section view illustrating the cup holder according to the embodiment of the present disclosure, in which the support plates are inserted into support grooves.
Figure 4B:
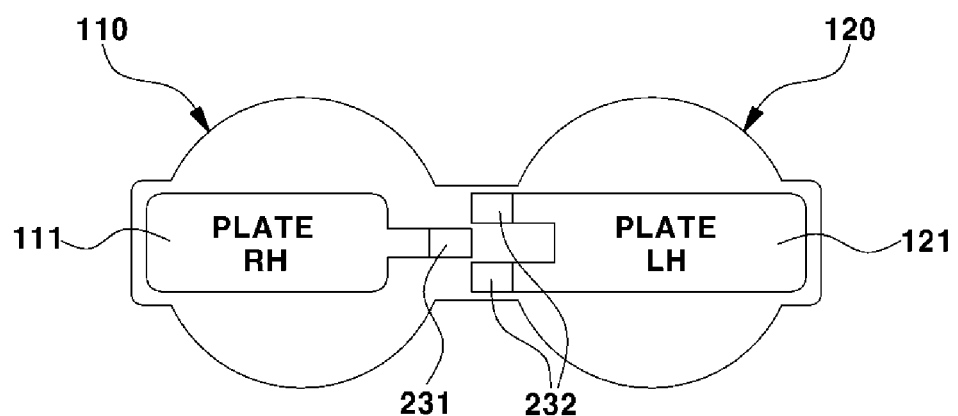
FIG. 4B is a plan view illustrating an engagement relationship between protrusions and the support plates according to the embodiment of the present disclosure, in which the support plates are inserted into the support grooves.

FIGS. 4A and 4B are a side cross-sectional view and a bottom view of the cup holder 10 when the first cup holder plate 110 is received in the first stand 210 and the second cup holder plate 120 is received in the second stand 220.

As illustrated in the drawings, when the first cup holder plate 110 is received in the first stand 210, the second cup holder plate 120 is positioned so as to correspond to the second stand 220 and the guide member 230 is positioned so as to correspond to the first support plate 111 and the second support plate 121.

Specifically, the first support plate 111, which is provided at the first cup holder plate 110, is moved to a position corresponding to the inner protrusion 233, and the second support plate 121, which is provided at the second cup holder plate 120, is moved to a position corresponding to the outer protrusion 235, as illustrated in FIG. 4B.

Accordingly, the first and second support plates 111 and 121 are received while interfering with the protrusions 233, 235, and the cup holder unit 100 is further received in the state in which the first and second support plates 111 and 121 are in contact with the protrusions 233, 235, thereby pushing the first and second support plates 111 and 121 away from the central member 130. Here, since the support grooves 240 are formed at positions corresponding to the first and second support plates 111 and 121, which are pushed outwards, the first and second support plates 111 and 121 are inserted into the support grooves 240, thereby holding the cup holder unit 100.

By virtue of the above-mentioned engagement structure, the first cup holder plates 110 and 120 are held at a level higher than the bottom surface of the cup holder housing 200 by a predetermined height.

Figure 5A:
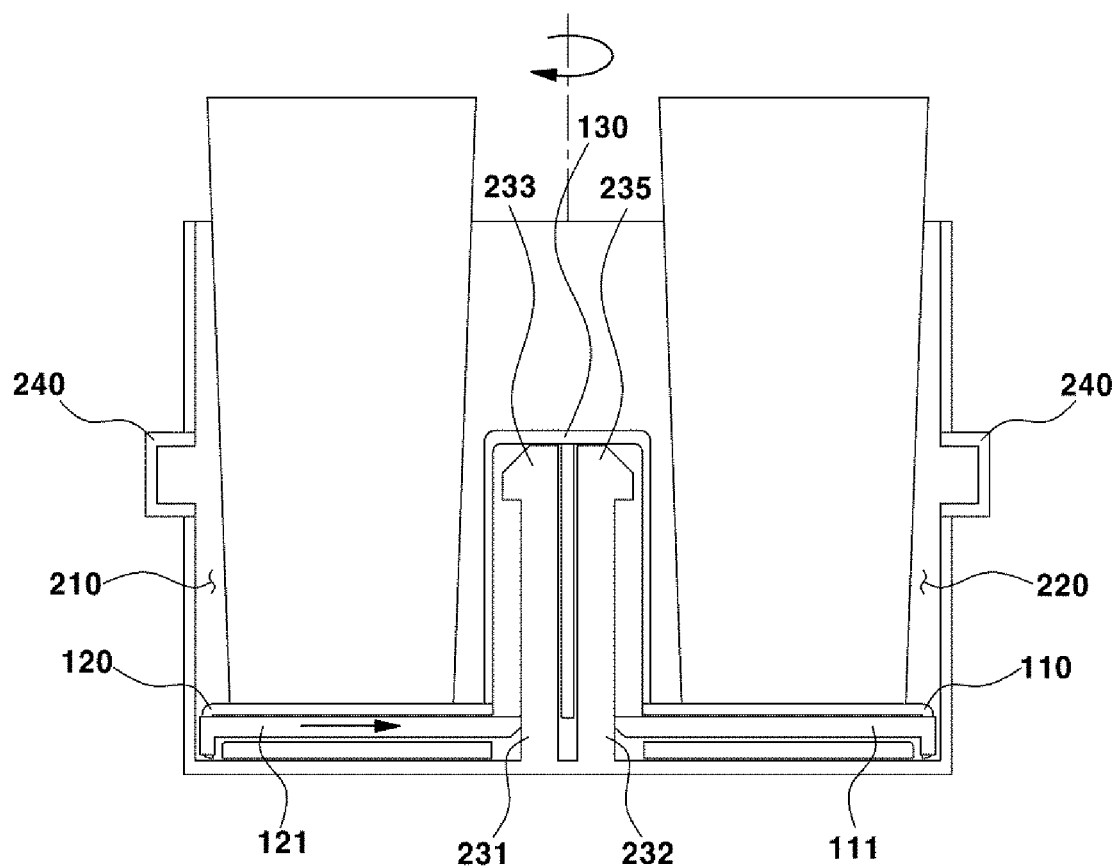
FIG. 5A is a side cross-sectional view illustrating the cup holder according to the embodiment of the present disclosure, in which cup holder plates are provided on the lower surface of the cup holder housing.
Figure 5B:
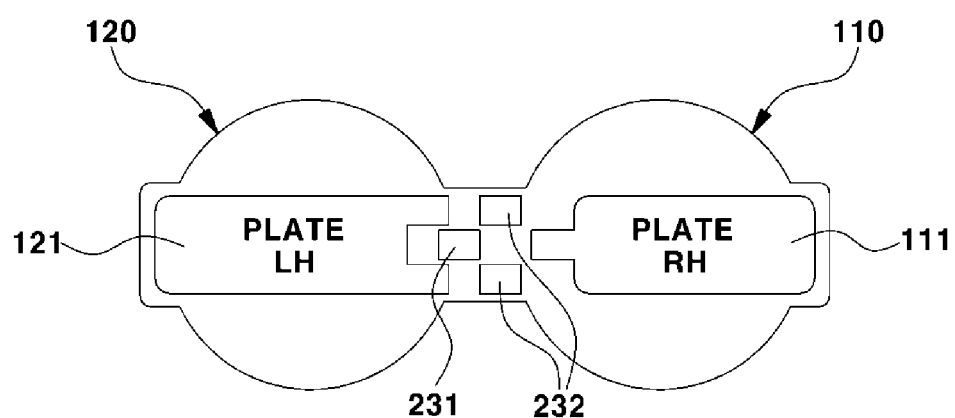
FIG. 5B is a plan view illustrating an engagement relationship between the protrusions and the support plates according to the embodiment of the present disclosure, in which the cup holder plates are provided on the lower surface of the cup holder housing.

Unlike this engagement relationship, FIGS. 5A and 5B illustrate another engagement structure between the guide member 230 and the central member 130 when the first cup holder plate 110 is received in the second stand 220 while the second cup holder plate 120 is received in the first stand 210.

As illustrated in the drawings, the first cup holder plate 110 is received in the second stand 220 while the second cup holder plate 120 is received in the first stand 210 such that the first cup holder plate 110 and the second cup holder plate 120 come into contact with the bottom surface of the cup holder housing 200.

In other words, when the first cup holder plate 110 is received in the second stand 220, the first end of the first support plate 111, which is provided at the first cup holder plate 110, is received in the space between the two outer stoppers 232, which are spaced apart from each other such that the first end of the first support plate 111 does not interfere with the protrusions 233, 235 formed on the outer stoppers 232.

Meanwhile, the second cup holder plate 120 is received in the first stand 210. Here, the first end of the second support plate 121, which is provided at the second cup holder plate 120, is positioned so as not to interfere with the protrusion 233 formed on the inner stopper 231.

Specifically, since the first end of the first support plate 111, which is provided at the first cup holder plate 110, is configured to have a protrusion shape, and the first support plate 111 is configured to correspond to the inner protrusion 233 formed on the inner stopper 231, the first support plate 111 may be moved in the height direction of the cup holder housing 200 without interfering with the outer protrusions 235 formed on the outer stoppers 232. Furthermore, since the second support plate 121, which is provided at the second cup holder plate 120, is configured to have a "U" shape corresponding to the outer protrusions 233 formed on the outer stoppers 232 so as not to interfere with the inner protrusion 233 of the inner stopper 231, the second support plate 121 does not interfere with the inner stopper 231 when the second cup holder plate 120 is received in the first stand 210 adjacent to the inner stopper 231.

As illustrated in FIGS. 4A to 5B, according to an embodiment of the present disclosure, the first end of the first support plate 111, which is provided at the first cup holder plate 110, is configured to have the shape of a single protrusion so as to correspond to the inner protrusion 233, and the first end of the second support plate 121, which is provided at the second cup holder plate 120, is configured to have a "U" shape so as to correspond to the outer protrusions 235. Accordingly, the first and second cup holder plates 110 and 120 may be held at different heights in the cup holder housing 200 depending on the coupling relationship between the first and second cup holder plates 110 and 120 and the first and second stands 210 and 220. Here, the first ends of the first and second support plates 111 and 121, which are provided at the cup holder plates 110 and 120, may be configured to have various shapes so as to correspond to the shapes of the inner stopper 231 and the outer stoppers 232.

Figure 6A:
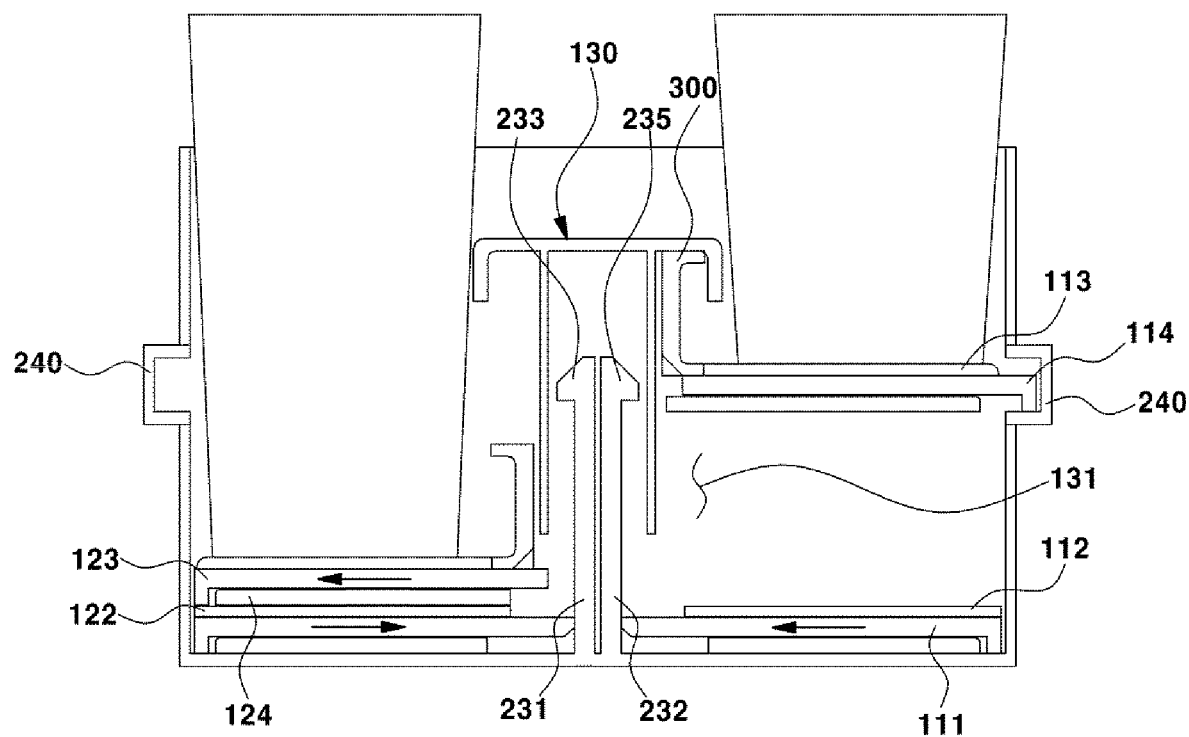
FIG. 6A is a side cross-sectional view illustrating an upper plate according to an embodiment of the present disclosure, a height of which is independently adjusted.
Figure 6B:
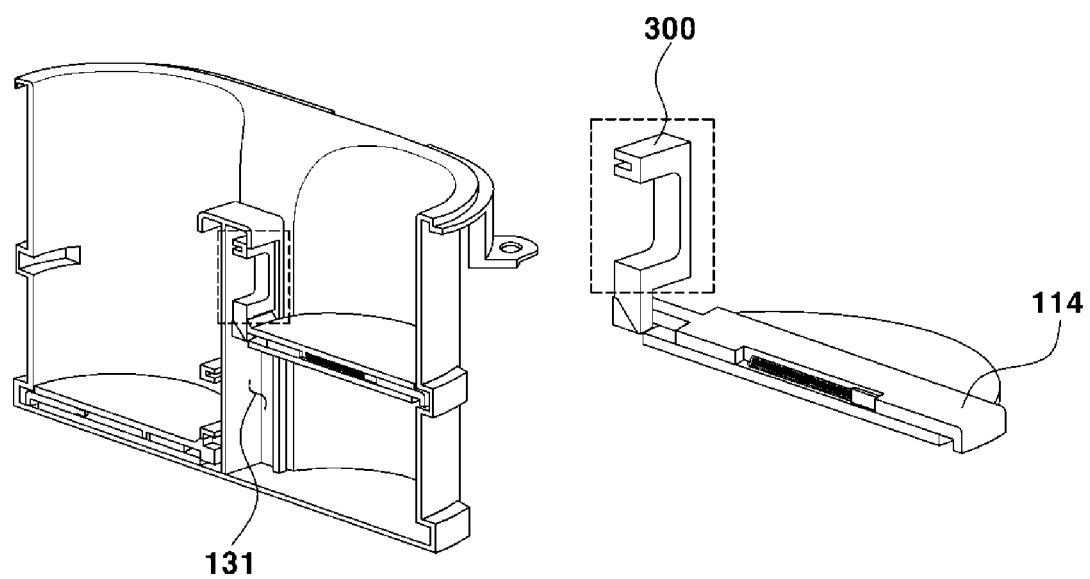
FIG. 6B is a view illustrating the upper plate according to the embodiment of the present disclosure, a height of which is independently adjusted.

FIGS. 6A and 6B illustrate an upper plate 113, which allows the first and second cup holder plates to be independently adjusted in height.

According to an embodiment of the present disclosure, the cup holder may include the upper plate 113, which is provided at at least one of the first cup holder plate 110 and the second cup holder plate 120. FIG. 5A illustrates the upper plate 113, which is provided at the first cup holder plate 110 so as to be vertically moved, in the state in which the first cup holder plate 110 is received in the second stand 220.

The upper plate 113 may be separate from a lower plate 112 so as to be moved in the height direction of the cup holder housing 200 along the central member 130. Furthermore, since the central member 130 has therein a groove 131, a lever 300, which is integrally formed with the upper plate 113, is moved along the groove 131, whereby the upper plate 113, which is integrally formed with the lever, is vertically movable independently of the lower plate 112.

The upper plate 113 is provided on the lower surface thereof with an upper support plate 114, and the second end of the upper support plate 114 is inserted into the support groove 240 formed in the cup holder housing 200. The upper support plate 114 may include a spring for applying elastic force in a direction away from the central member 130. Accordingly, the first end of the upper support plate 114 may be moved toward the central member 130 by vertical movement of the lever 300. Consequently, when the lever 300 is vertically moved, the upper support plate 114 is moved toward the central member 130 and is thus moved together with the lever 300 and the upper plate 113.

Here, since elastic force is applied to the upper support plate 114 by means of the spring provided at the upper plate 113, the upper support plate 114 is biased in a direction away from the central member 130. When the upper plate 113 is positioned at the support groove 240, the upper support plate 114 is inserted into the support groove 240 and is held therein.

According to an embodiment of the present disclosure, the cup holder plate may be divided into the upper plate 113 and the lower plate 112, and the upper plate 113 is capable of being vertically moved independently of the other plate in the state in which the cup holder unit 100 is held.

Figure 7A:
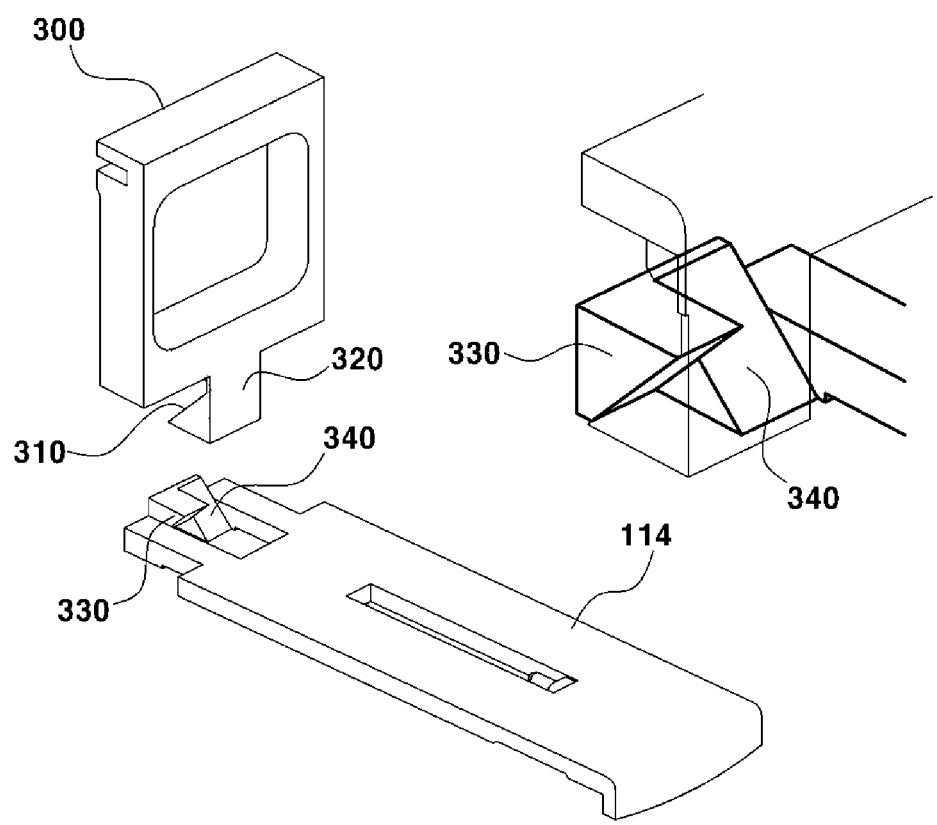
FIG. 7A is perspective view illustrating a structure for adjusting the height of the upper plate according to an embodiment of the present disclosure.
Figure 7B:
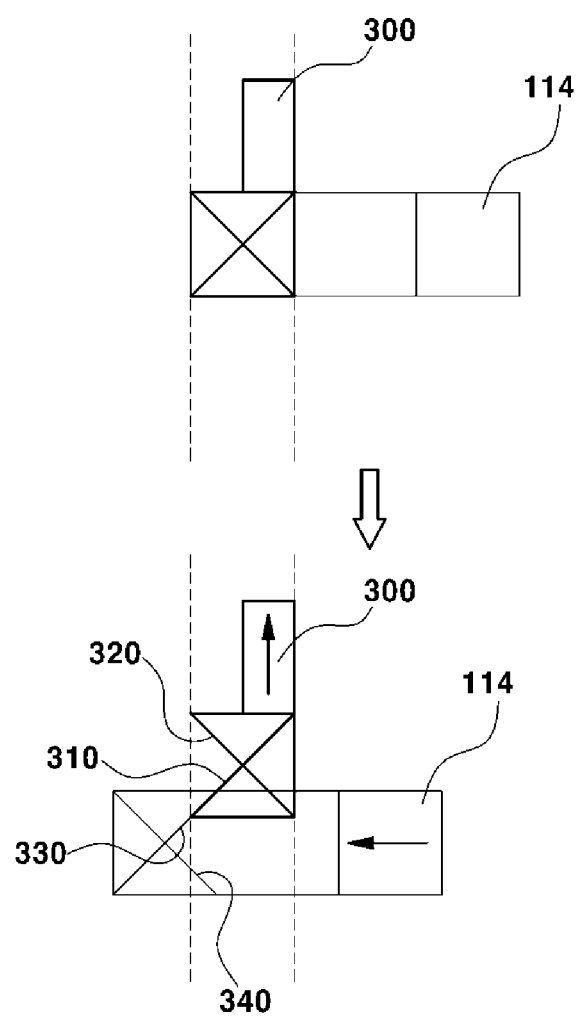
FIG. 7B is a view illustrating the upper support plate according to the embodiment of the present disclosure, which is moved toward a central member by downward movement of a lever.
Figure 7C:
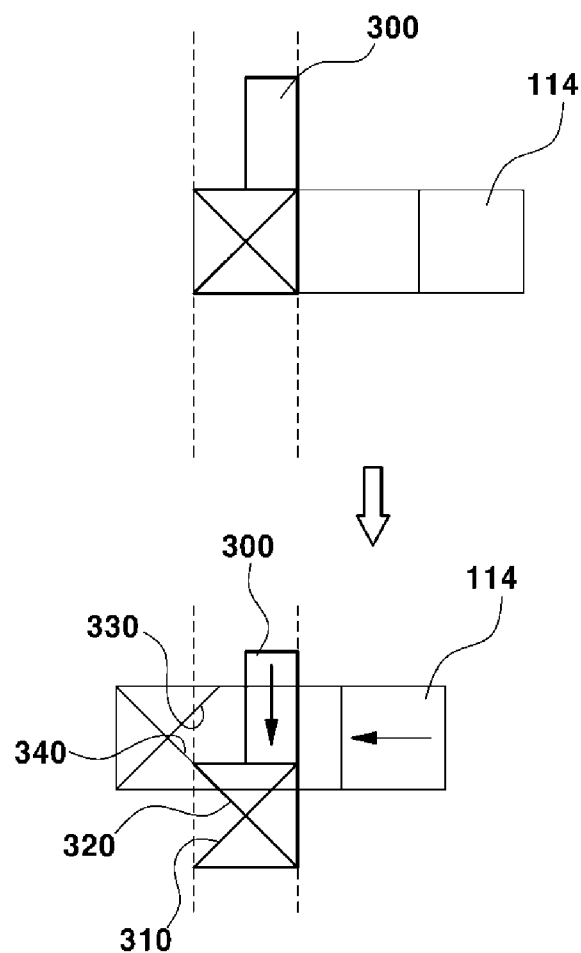
FIG. 7C is a view illustrating the upper support plate according to the embodiment of the present disclosure, which is moved toward a central member by upward movement of the lever.

FIGS. 7A to 7C illustrate a structure capable of moving the upper support plate 114, which is provided at the upper plate 113, in a longitudinal direction by action of the lever 300 when the lever 300 is vertically moved along the groove 131.

The lever 300, which is positioned so as to be in contact with the first end of the upper support plate 114, includes a first oblique portion 310 and a second oblique portion 320. The first oblique portion 310 is configured such that the sectional area thereof increases moving downwards in the height direction of the lever 300. The second oblique portion 320 is positioned so as to be adjacent to the first oblique portion 310 in a width direction and to define an angular difference of 90 degrees relative to the first oblique portion 310. For example, the first oblique portion 310 and the second oblique portion 320 of the lever 300 may be configured to be respectively oriented at angles of +45 degrees and −45 degrees. Consequently, the first oblique portion 310 serves to move the upper support plate 114 toward the central member 130 when the lever 300 is moved upwards, and the second oblique portion 320 serves to move the upper support plate 114 toward the central member 130 when the lever 300 is moved downwards.

A third oblique portion 330 is located at the first end of the upper support plate 114, and is configured to have a slope corresponding to that of the first oblique portion 310. A fourth oblique portion 340 is positioned adjacent to the third oblique portion 330, and is configured to have a slope corresponding to that of the second oblique portion 320 so as to be in surface contact with the second oblique portion 320.

As illustrated in FIG. 7B, when the lever 300 is moved upwards, the first oblique portion 310 is moved together with the lever 300, and the third oblique portion 330 of the upper support plate 114, which is configured to be in surface contact with the first oblique portion 310, is moved toward the central member 130, thereby moving the upper support plate 114 toward the central member 130. Meanwhile, when the lever 300 is moved upwards, the second oblique portion 320 and the fourth oblique portion 340 are separated and spaced apart from each other.

FIG. 7C illustrates the movement of the upper support plate 114 when the lever 300 is moved downwards.

When the lever 300 is moved downwards, the second oblique portion 320 is moved together with the lever 300, and the fourth oblique portion 340, which is in surface contact with the second oblique portion 320, is moved toward the central member 130, thereby moving the first end of the upper support plate 114 toward the central member 130.

Consequently, the second end of the upper support plate 114 is released from the support groove 240, and the upper support plate 114 is thus moved downwards together with the lever 300.

To sum up, since the upper support plate 114 is moved in a longitudinal direction along the upper plate 113 by virtue of movement of the lever 300, the upper support plate 114 is selectively engaged with or released from the support groove 240.

The present disclosure offers the following effects by virtue of the above-described constructions of the embodiments.

Since the cup holder according to the present disclosure is configured such that the cup holder plates, which are provided in respective stands, are capable of being selectively adjusted in height, there is an effect of improving the user's convenience.

Furthermore, since the cup holder according to the present disclosure is configured such that the cup holder plates, which are provided in the respective stands, are capable of being independently adjusted in height, there is an effect of improving convenience in use.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A height-adjustable cup holder comprising:
   a cup holder housing including a first stand and a second stand positioned adjacent to each other;
   a guide member positioned on a bottom surface of the cup holder housing between the first stand and the second stand;
   a cup holder unit comprising a first cup holder plate, a second cup holder plate, and a central member positioned between the first cup holder plate and the second cup holder plate and fitted onto the guide member, the cup holder unit being releasably coupled to the cup holder housing; and
   first and second support plates capable of moving along the respective cup holder plates so as to hold the cup holder unit on an inner side surface of the cup holder housing,
   wherein the first and second support plates are each fitted into a support groove formed in the inner side surface of the cup holder housing.

2. The height-adjustable cup holder of claim 1, wherein the guide member includes:
   an outer stopper positioned adjacent to the second stand between the first stand and the second stand; and
   an inner stopper positioned adjacent to the first stand and spaced apart from the outer stopper.

3. The height-adjustable cup holder of claim 2, wherein each of the outer and inner stoppers includes a protrusion formed at a first end thereof, the protrusions being positioned at a height corresponding to a height of the support grooves.

4. The height-adjustable cup holder of claim 3, wherein, when the first cup holder plate is received in the first stand, the first support plate, which is positioned at the first cup holder plate, is brought into contact at a first end thereof with the protrusion of the inner stopper and is inserted at a second end thereof into one of the support grooves.

5. The height-adjustable cup holder of claim 4, wherein, when the second cup holder plate is received in the second stand, the second support plate, which is positioned at the second cup holder plate, is brought into contact at a first end thereof with the protrusion of the outer stopper and is inserted at a second end thereof into a remaining one of the support grooves.

6. The height-adjustable cup holder of claim 1, wherein, when the second cup holder plate is received in the first stand, the second cup holder plate is positioned so as to be in contact with a bottom surface of the cup holder housing.

7. The height-adjustable cup holder of claim 6, wherein, when the second cup holder plate is received in the first stand, the first cup holder plate is received in the second stand.

8. The height-adjustable cup holder of claim 1, wherein each of the first and second cup holder plates includes an elastic element for applying elastic force to restore a corresponding one of the first and second support plates to an initial position thereof.

9. The height-adjustable cup holder of claim 1, wherein each of the first and second cup holder plates includes:
   a guide plate having an open upper face; and
   a slot formed through an outermost side wall of the guide plate so as to allow a corresponding one of the first and second support plates to be moved therethrough.

10. The height-adjustable cup holder of claim 1, further comprising at least one frictional member provided at the cup holder housing facing the central member.

11. The height-adjustable cup holder of claim 1, further comprising:
    a groove formed in the central member in a height direction;
    a lever movable along the groove; and
    an upper plate coupled to the lever and disposed on an upper surface of one of the first and second cup holder plates.

12. The height-adjustable cup holder of claim 11, further comprising an upper support plate positioned on a lower surface of the upper plate and fitted into a corresponding one of the support grooves.

13. The height-adjustable cup holder of claim 12, wherein the upper support plate is configured to move toward the guide member by force applied to the lever in a height direction.

14. The height-adjustable cup holder of claim 13, wherein the lever includes a first oblique portion and a second oblique portion, the first oblique portion being configured so as to move the upper support plate toward the central member when the lever is moved upwards in a height direction.

15. The height-adjustable cup holder of claim 13, wherein the second oblique portion is configured so as to move the upper support plate toward the central member when the lever is moved downwards in a height direction.

16. The height-adjustable cup holder of claim 1, further comprising a protective member positioned at an inner surface of the central member facing the guide member.

\* \* \* \* \*